United States Patent [19]

Dunn

[11] Patent Number: 4,699,472
[45] Date of Patent: Oct. 13, 1987

[54] POLARIZATION CONTROLLING DEVICE AND METHOD

[75] Inventor: Aubrey J. Dunn, Springfield, Va.

[73] Assignee: The United States of America as represented by the Secretary of the Army, Washington, D.C.

[21] Appl. No.: 831,771

[22] Filed: Feb. 21, 1986

[51] Int. Cl.$^4$ .......................... G02B 27/28; G02F 1/01
[52] U.S. Cl. .................................... 350/377; 350/403
[58] Field of Search .................. 350/376–377, 350/385, 388, 401, 403

[56] References Cited

U.S. PATENT DOCUMENTS

| | | | |
|---|---|---|---|
| 3,535,021 | 10/1970 | Amodei | 350/376 |
| 3,704,997 | 12/1972 | Smith | 350/401 |
| 3,719,414 | 3/1973 | Wentz | 350/403 |
| 4,335,939 | 6/1982 | Stovell et al. | 350/403 |

FOREIGN PATENT DOCUMENTS 1409711  10/1975  United Kingdom ................ 350/385

OTHER PUBLICATIONS

Rowe, S. H., "Efficiency Enhancement of Light Modulators", App. Optics, 5-1970, p. 1222.

*Primary Examiner*—William H. Punter
*Attorney, Agent, or Firm*—Max L. Harwell; Aubrey J. Dunn; Anthony T. Lane

[57] ABSTRACT

An unpolarized light beam is split into two orthogonal polarized beams. Each polarized beam is attenuated by passing it through the sequence of a first polarization rotator, an analyzer, and a second polarization rotator. The attenuated beams are combined to yield a beam with the desired type or space-orientation of polarization.

5 Claims, 1 Drawing Figure

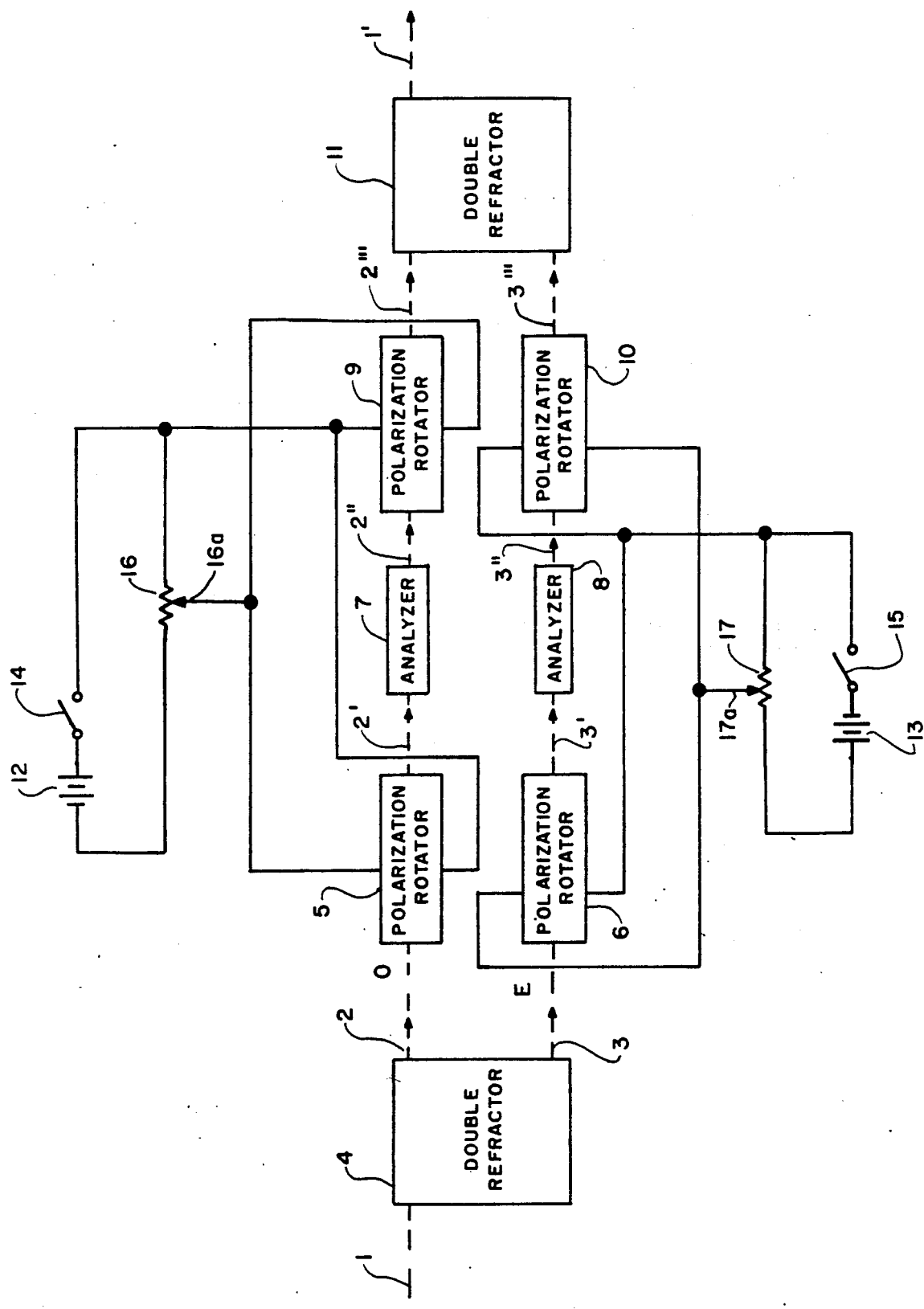

POLARIZATION CONTROLLING DEVICE AND METHOD

The invention described herein may be manufactured, used, and licensed by the U.S. Government for governmental purposes without the payment of any royalties thereon.

BACKGROUND OF THE INVENTION

This invention is in the field of light polarization control devices, and is particularly concerned with those devices which vary the direction or type of polarization from a polarized or unpolarized light beam. Heretofore, in order to generate a light beam with a particular type of polarization or space orientation of polarization, it has been necessary to use an unpolarized light beam, and to pass such a beam through polarizing materials or to reflect it off various surfaces. Additionally, the materials or surfaces must be physically rotated in order to give a particular space orientation for linerally polarized beams.

SUMMARY OF THE INVENTION

The invention is a device and method for controlling the type or space orientation of polarization of a light beam. The beam is first divided into two orthogonally polarized beams, these beams are then controlled in amplitude by being passed through first respective polarization rotators and analyzers, are rotated by second respective polarization rotators to negate the rotation imparted by the first rotators, and finally are recombined to form a beam of the desired type or space orientation of polarization.

BRIEF DESCRIPTION OF THE DRAWING

The single drawing FIGURE is a schematic diagram of the inventive device.

DESCRIPTION OF PREFERRED EMBODIMENT

This description may be best understood when taken in conjunction with the drawing. In the drawing, reference numeral 1 designates a ray of incident unpolarized electromagnetic radiation. This radiation is split into equal substantially amplitude ordinary and extraordinary polarized rays 2 and 3 by double refractor 4. This refractor is a material which is birefringent for incident radiation. Rays 2 and 3 respectively pass into polarization rotators 5 and 6. A typical rotator is a Kerr cell; the amount of rotation induced in the rays is proportional to the voltage applied to such a cell. Rotators 5 and 6 have voltage applied from respective voltage sources, which will be described later. The rays emerging from rotators 5 and 6 are designated 2' and 3' and pass through respective analyzers 7 and 8. These analyzers are oriented such that nonrotated O and E rays pass freely through, but rotated rays are blocked in proportion to their rotations by 5 and 6. The output rays 2" and 3" from the analyzers pass through polarization rotators 9 and 10. These rotators correspond to rspective rotators 5 and 6 and rotate the polarization rays 2''' and 3''' to negate the rotations imparted by 5 and 6. Thus, rays 2''' and 3''' have the same space orientation as rays 2 and 3, but with their relative amplitudes changed in accordance with the rotations imparted in 5 and 6. Rays 2''' and 3''' are combined in double refractor 11 to produce a composite ray 1'. This composite ray is effectively the vector sum of rays 2''' and 3''', which have respective amplitudes as determined by respective elements 5, 7, 9 and 6, 8, 10; 2''' and 3''' have the polarizations of respective ordinary and extraordinary rays 2 and 3. The type of polarization and its space orientation in ray 1' is thus determined by rotators 5 and 6, since the amplitudes of rays 2''' and 3''' are dependent on the rotations imparted by these rotators. As mentioned above, the rotations imparted by rotators 5 and 6 (and by 9 and 10) are proportional to the voltages applied thereto; these voltages are supplied by batteries 12 and 13. These batteries are in series with respective switches 14 and 15 and voltage adjustable dividers 16 and 17. In operation, switches 14 and 15 are closed, and sliders 16$a$ and 17$a$ of dividers 16 and 17 are adjusted to give the desired voltages to rotators 5,6,9, and 10. As can be seen, the voltages applied to 5 and 6 are the opposite polarity from those applied to 9 and 10, such that polarization rotations induced in 5 and 6 are negated in 9 and 10. With proper adjustment of the voltages to the various polarization rotators, an output ray 1' may be provided with linear polarization in any desired space orientation, or with circular or elliptical polarization. Obviously, the simple voltage control circuits shown could be replaced by more complex and rapid controllers, such as a computer controlling a transistor, or its equivalent. The rate of change of polarization is limited only by the response times of the polarization rotators.

While I have shown my invention as an optical system with discrete optical elements laid out in a linear fashion, it should be obvious that the system could be integrated or folded. For example, rather than using two double refractors and two sets of polarization rotators, the O and E rays may be reflected back through the same polarization rotators used to impart initial rotation, and combined in the same double refractor used to originally separate the said rays.

I claim:

1. A device for generating a light beam of a particular polarization from an unpolarized beam of light wherein said device includes:
   means for separating said unpolarized beam into two polarized beams with orthogonal polarizations;
   means for adjusting the relative amplitudes of said polarized beams;
   and means for combining said adjusted beams, wherein said means for adjusting includes:
   individual means for rotating the polarization of each polarized beam by a desired amount;
   individual analyzers for each of said rotated polarized beams;
   and individual means for negating the polarization rotation of said beams by said means for rotating.

2. A device for generating a light beam of a particular polarization from an unpolarized beam of light wherein said device includes:
   means for separating said unpolarized beam into two polarized beams with orthogonal polarizations;
   means for adjusting the relative amplitudes of said polarized beams;
   and means for combining said adjusted beams, wherein said means for adjusting includes means for attenuating either or both of said polarized beams, and wherein said means for attenuating comprises:
   individual means for rotating the polarization of each polarized beam by a desired amount;
   individual analyzers for each of said rotated polarized beams;

and individual means for negating the polarization rotation of said beams by said means for rotating.

3. The device as set forth in claim 1 wherein each said means for separating and for combining is a double refractor.

4. The device as set forth in claim 2 wherein each said means for separating and for combining is a double refractor.

5. A method of controlling the polarization of a beam of light derived from an unpolarized beam of light, including the steps of:

separating said unpolarized beam into two beams with orthogonal polarizations;
selectively adjusting the relative amplitudes of said polarized beams;
and combining said adjusted beams, wherein the step of selectively adjusting includes the steps of:
individually rotating the polarization of said two beams;
transmitting portions of said two beams in accordance with the rotations imparted thereto;
and negating the polarization rotations of said transmitted beams.

* * * * *